United States Patent
Hayes

(10) Patent No.: US 6,225,944 B1
(45) Date of Patent: May 1, 2001

(54) MANUAL REPORTING OF LOCATION DATA IN A MOBILE COMMUNICATIONS NETWORK

(75) Inventor: Stephen Hayes, Carrollton, TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/460,186

(22) Filed: Dec. 11, 1999

(51) Int. Cl.⁷ .................................................. H04B 7/185
(52) U.S. Cl. ............................ 342/357.1; 342/357.06; 342/357.09
(58) Field of Search ................... 342/357.1, 357.01, 342/357.06, 357.09, 452; 701/213

(56) References Cited

U.S. PATENT DOCUMENTS

| | | | |
|---|---|---|---|
| 3,678,391 | * 7/1972 | Gough | 325/55 |
| 4,445,118 | * 4/1984 | Taylor et al. | 343/357 |
| 5,223,844 | * 6/1993 | Mansell et al. | 342/357 |
| 5,343,493 | * 8/1994 | Karimullah | 375/1 |
| 5,361,399 | * 11/1994 | Linquist et al. | 456/56.1 |
| 5,369,783 | * 11/1994 | Childress et al. | 455/17 |
| 5,432,798 | * 7/1995 | Blair | 371/32 |
| 5,717,389 | * 2/1998 | Mertens et al. | 340/928 |
| 5,799,245 | * 8/1998 | Ohashi | 455/69 |

* cited by examiner

Primary Examiner—Thomas H. Tarcza
Assistant Examiner—Dao L. Phan
(74) Attorney, Agent, or Firm—Arthur I. Navarro

(57) ABSTRACT

The invention is, in one embodiment, a method of reporting the location of a mobile phone by locating a Global Positioning System (GPS) receiver in a mobile communications network. The method first determines the location of the GPS receiver, processes data identifying the location, then synthesizes the location information into a Tele-type (TTY/TDD) compatible format and transmits the location. A TTY/TDD device at a receiving station will process the location data to identify the location of the mobile phone. In one aspect, the method is implemented through modular programming. The invention is also a mobile phone capable of transmitting location information gathered by a Global Positioning System (GPS) receiver to a Public Safety Answering Point (PSAP). The mobile phone houses a transceiver, a GPS receiver, and a Tele-type (TTY/TDD) synthesizer in communication with the GPS receiver and the transceiver.

21 Claims, 1 Drawing Sheet

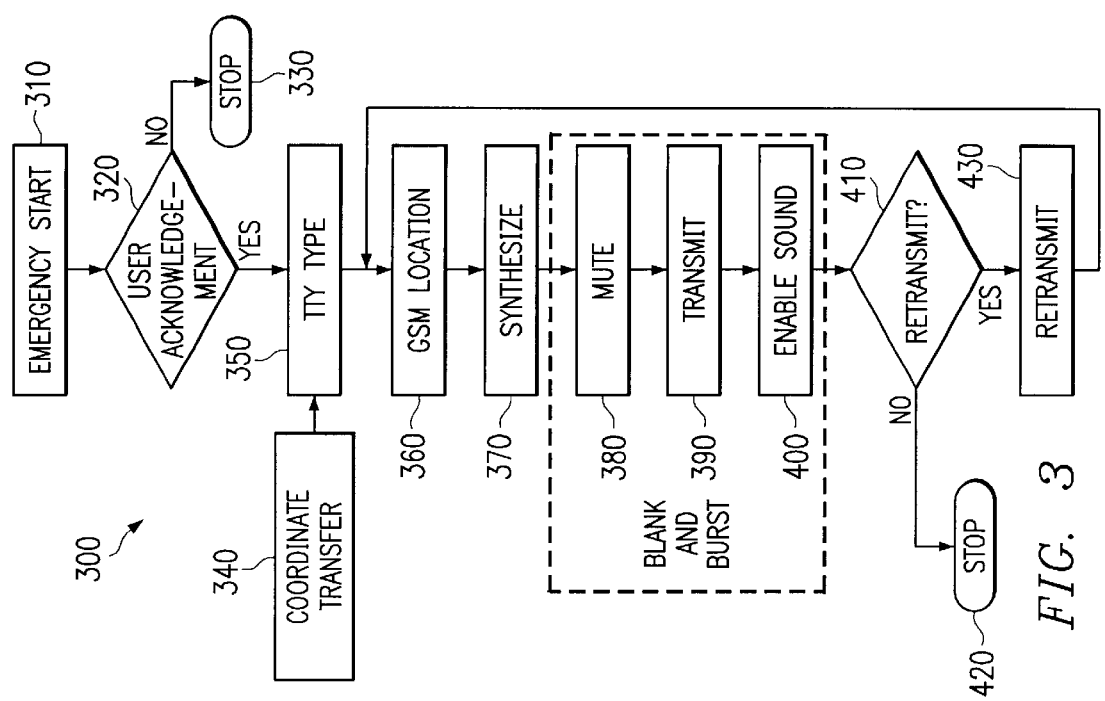
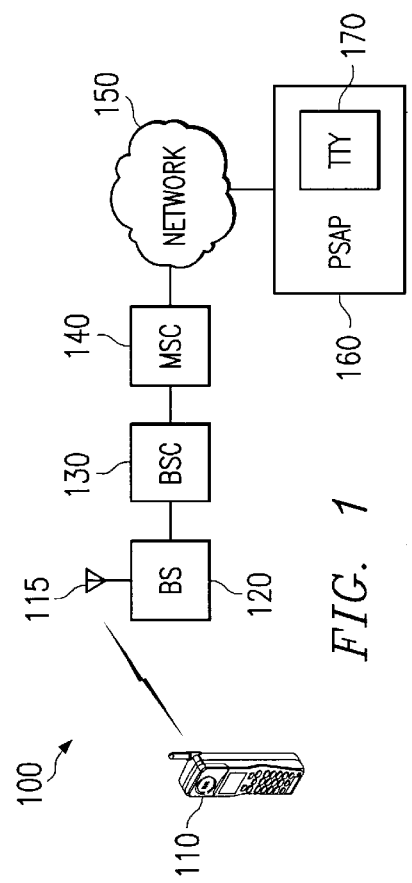
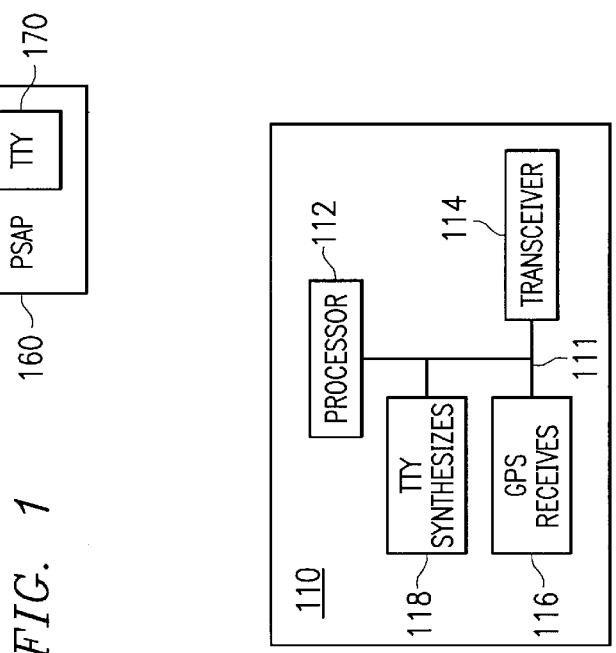

MANUAL REPORTING OF LOCATION DATA IN A MOBILE COMMUNICATIONS NETWORK

TECHNICAL FIELD

The present invention generally relates to wireless communication networks, including cellular-type wireless networks, and more particularly to the positioning of a mobile phone with a Location Determination Units (Such as Global Positioning System (GPS) receivers and GPS-like receivers).

BACKGROUND OF THE INVENTION

Wireless communication networks continue to evolve with enhanced and new features being developed for deployment in current and future generation networks. One particular area of development resides in the area of positioning a mobile station within a wireless network quickly, with high accuracy, and with nominal network traffic. By government mandate, future networks must be able to provide location information with emergency (E-911) calls.

For example, in the United States of America, the Federal Communications Commission (FCC) has mandated that mobile phone handsets provide location information to a Public Safety Answering Point (PSAP) which is the public facility which receives and processes emergency calls. The FCC specifications require positioning to an accuracy of less than 50 meters. This allows emergency personnel or police to be able to locate and help the caller in cases where the caller may not know his/her location, or when he may be unable to speak.

It is often desirable to position mobile phones on demand as well. For example, on demand mobile phone positioning is finding acceptance in commercial applications, such as in fleet management for rental car fleets, and to obtain position on demand to aid in navigation.

Unfortunately, the positioning of a mobile phone is particularly difficult due to a several factors. First, positioning of a mobile phone is encumbered due to multi-path problems as well as the fading of signals, which make simple triangulation measurements unreliable enough for high accuracy calculations. Time of Arrival (TOA) techniques measure the time it takes to receive synchronized signals that are broadcast from various known points, such as Base Stations (BSs). The TOA information is sent back to a network node, such as a Mobile Switching Center (MSC), which uses an algorithm to roughly determine the position of a mobile. Unfortunately, these techniques can only provide the general position of a mobile phone, and will often fail to meet the high resolution requirements mandated by government agencies.

Mobile phones having Global Positioning System (GPS) receivers therein are one viable solution to providing a position of a mobile phone with high accuracy. GPS is based on triangulating, along lines of sight, with at least three of the many GPS satellites that circle the earth that were launched by the US Government beginning in 1978. GPS is a well-known technology and is used in many military and civilian applications. The resolution of GPS meets the requirements of both the FCC-mandated E-911 service, as well as other market-driven demands. Accordingly, the most common method of providing location data is to have mobile phones with GPS receivers therein.

However, in order to be useful, this geographic information must be communicated to the PSAPs, and the PSAP must be able to process it. Efforts are underway to standardize methods and systems to automatically transmit coordinate information to the PSAPs. Amazingly, although there is a FCC mandate that the carriers must provide location information, there is no FCC mandate that the PSAPs be able to receive it. This may be because the hardware equipment and software upgrades needed to be able to receive the location information at the PSAP will likely be expensive, and thus deployment of location technology within PSAPs may be slow.

Since it may be some time before PSAPs can incorporate location equipment, mobile phones with GPS capability may be sold on the consumer's belief that the mobile phone will provide location information for emergency calls, but in many cases the PSAP that receives an emergency call will not be able to process the information. This will likely cause consumer irritation, or possibly lawsuits. Therefore, what is needed is a system and method of transmitting coordinate information for a mobile phone to a PSAP that uses equipment already available at the PASP.

SUMMARY OF THE INVENTION

The present invention achieves technical advantages as a method, mobile phone and computer program that allows for the manual reporting of location data in a mobile communication network. The method gathers location information from a Global Positioning System (GPS) receiver and then converts the location information into a Teletype/Telephony Device for the Deaf (TTY/TDD) format before transmitting the location information. The mobile phone has the devices needed to implement the method, particularly, a TTY/TDD synthesizer. The computer program implements the method through modular programming. Accordingly, the present invention provides the ability to provide quality location information with currently available equipment.

In one embodiment, the present invention is a method of reporting the location of a mobile phone by locating a Global Positioning System (GPS) receiver in a mobile communications network. The method first determines the location of the GPS receiver, which is integrated into the mobile phone. Next, the location is processed and the data identifying the location is designated as location information. Then, the location information is synthesized into a Tele-type (TTY/TDD) compatible format and transmitted as a TTY/TDD transmission. A TTY/TDD device at a receiving station will process the location data to identify the location of the mobile phone.

In another embodiment, the invention is a mobile phone capable of transmitting location information gathered by a Global Positioning System (PGS) receiver to a Public Safety Answering Point (PSAP). The mobile phone houses a transceiver, a GPS receiver, and a TTY/TDD synthesizer in communication with the GPS receiver and the transceiver.

In yet another aspect, the present invention is a computer program capable of reporting a location of a Global Positioning System receiver in a mobile communication network. To accomplish this task, the computer program implements a location determination module, a GPS to TTY/TDD synthesizing module, and a transmission module.

BRIEF DESCRIPTION OF THE DRAWINGS

Other aspects of the invention, including specific embodiments, are understood by reference to the following Detail Description of a Preferred Embodiment, which should be read in conjunction with the drawings, in which:

FIG. 1 is a block diagram illustrating the components of a mobile communications network that are used to implement the present invention;

FIG. 2 is a component block-diagram of a mobile phone showing selected elements of the invention; and FIG. 3 is a flowchart of a method for practicing the invention.

DETAILED DESCRIPTION OF A PREFERRED EMBODIMENT

The present invention offers the advantages of locating a GPS device, such as a mobile phone having a GPS receiver therein, in a mobile communications network without requiring additional hardware to be placed in the network. Furthermore, the invention provides the user with flexibility in choosing how the location information is to be sent to a Teletype (TTY/TDD) compatible receiving station. Thus, the invention will save mobile communications network providers money because they will not need to purchase additional hardware equipment to meet government emergency location mandates. Also, the present invention will produce additional revenues in the form of user features and options that demand a premium.

Accordingly, the present invention is a method, mobile phone and computer program that allows for the manual reporting of location data in a mobile communication network. The method gathers location information from a Global Positioning System (GPS) receiver and then converts the location information into a Teletype Telephony Device for the Deaf (TTY/TDD) format before transmitting the location information to a TTY/TDD enabled receiver. The mobile phone has the devices needed to implement the method, particularly, a TTY/TDD synthesizer. The computer program implements the method through modular programming.

Teletype (TTY/TDD) is the preferred method of providing telephony access to the hearing impaired. It enables the transmission and reception of written text across telephone lines (the protocols that enable the TTY/TDD service is referred to as the TTY/TDD protocol). TTY/TDD is generally provided to deaf persons (as well as others who are hard-of-hearing—collectively, "the hearing impaired") so that they may communicate. In addition, TTY/TDD gives the deaf access to emergency services. To enable TTY/TDD emergency services, the FCC has mandated Public Safety Answering Points (PSAPs) that receive emergency (E-911) calls have the ability to answer and process calls that use TTY/TDD protocols.

TTY/TDD devices comprise the equipment that enable the receipt and processing of calls that use TTY/TDD protocols. Since the FCC has mandated that PSAPs be able to receive TTY/TDD based calls, most PSAPs already have TTY/TDD devices. Recently, the FCC has also required that mobile phones support TTY/TDD transmissions between the hearing impaired. This means that many mobile phones will soon have the ability to communicate with the TTY/TDD devices in PSAPs.

FIG. 1 is a block diagram illustrating the components of a mobile communications network 100 that are used to implement the present invention. In FIG. 1, a terminal device capable of voice channel communication, such as a mobile phone 110, communicates across an air interface with an antenna 115 to transmit voice channel and control channel signals to a base station 120. The base station 120 is in communication with a base station controller (BSC) 130, which typically services many base stations by relaying voice and control traffic from base stations to a Mobile Switching Center (MSC) 140. The functionality of a BSC 130 is achieved in a third generation (3G) system by a Radio Network Controller (RNC), and may be implemented in other systems by other devices.

Likewise, the MSC 140 manages the control channels and voice channels of several BSCs to provide continuous coverage and service across a geographic area. In 3G systems the functionality of the MSC is accomplished by a UMTS server, which may be implemented in a control plane which is separated from a voice (or a user) plane. Voice channel communications in the mobile communications network 100 travel from the mobile phone 110 across the air interface and are picked up by the antenna 115. The antenna 115 passes the communications to the base station 120, which then processes the voice communications and control communications as needed before sending them to the BSC 130. The BSC then relays the voice and control commands to the MSC, which then sends the voice across a network 150. The network 150 maybe an Internet Protocol (IP) network, an Asynchronous Transfer Mode (ATM) network, a Public Land Mobile Network (PLMN), or any other standard land based telephone system, such as one that uses signaling such as F7 signaling.

Attached to the network 150 is a Public Safety Answer Point (PSAP) 160. The PSAP receives emergency calls and then processes these calls to provide emergency services. The PSAP 160 has within it a Teletype/Telephony Device for the Deaf (TTY/TDD) equipment 170. Although the TTY/TDD equipment 170 is shown within the PSAP 160, the TTY/TDD equipment 170 maybe located remotely from the PSAP 160 and need only be in communication with the PSAP 160. Furthermore, although a PSAP is shown in FIG. 1 it should be understood that the PSAP is merely representative of a location capable of processing a TTY/TDD protocol signal, and may in fact be any hardware device or collection of devices.

The invention is particularly valuable when implemented in a mobile terminal device, such as a mobile phone. FIG. 2 is a component block-diagram of a mobile phone 110 showing selected elements of the invention. In FIG. 2, the processor 112, ATTY/TDD synthesizer 118, HEPS receiver 116, and a transceiver 114, communicate with each other across a communication bus 111. The processor 112 could be any standard mobile phone processor that handles user inputs. For example, the processor 112 stores information such as configuration options selected by the user.

Configuration options provided to the user include the ability to retransmit coordinates, or transmit a message selected by the user. Furthermore, a configuration option can allow a user to retransmit a coordinates or a message a fixed number of times, periodically, when movement of the GPS receiver 116 is detected, or upon a user request. More advanced user configurations allow a user to set a message to be transmitted in-band to the PSAP, allow a user to determine what is sent out (such as a message, coordinates, or both a message and coordinate), allow the user to determine the triggering mode (automatic, user initiated, or motion sensitive), allow the user to determine retransmission interval times, as well as the amount of time retransmissions will take place in, and allow the user to determine the transmission protocol. An automatic triggering mode is initiated when the mobile phone detects an event that automatically starts the GPS algorithm 300, discussed below. Likewise, a user initiated triggering mode means that the mobile phone is set up so that a user must initiate the GPS algorithm, while the motion sensitive mode initiates the GPS algorithm when the GPS receiver detects that it has moved more than a predetermined distance. Transmission protocols include Baudot, V21, DTMF (Dual Tone Multi-Frequency), and EDT (European Deaf Telephony), and the V.18 protocol.

The processor 112 also allows the user to determine what message will be transmitted. For example, the user may wish to transmit medical information which has been preloaded into the processor 112, or other information. In addition, the processor 112 detects the initiation of an emergency call and also detects the initiation of a request for a coordinate transfer.

The GPS receiver 116 receives signals from the GPS satellites which are circling the earth. The GPS receiver then takes the signals and computes coordinates based on the signals to produce a longitudinal statistic and a latitudinal statistic.

The TTY/TDD synthesizer 118 processes the GPS location information input and produces a TTY/TDD protocol formatted output. For example, when the GPS receiver 116 produces the longitudinal statistic and the latitudinal statistic (the statistics), the TTY/TDD synthesizer 118 processes the statistics into a TTY/TDD format which is transmitted by the transceiver 114 and receivable and interpretable by the TTY/TDD device 170.

The transceiver 114 sends and receives radio communications across the air interface with the base station 120 by synthesizing the necessary tones or signals to transmit the encoded data to a TTY/TDD devices in a PSAP. In particular, the transceiver 114 is able to send TTY/TDD protocol formatted messages across the voice channel. This allows the transmission of TTY/TDD data over the air interface in second and first generation mobile communications networks. However, it is possible that the location information could be transmitted across the control channel as a control channel message, and in this case the transceiver will send data which encodes the TTY/TDD formatted message across the control channel.

FIG. 3 is a flowchart of a method for practicing the invention. The GPS algorithm 300 with a location query by a user, which can be either an emergency start step 310 or a coordinate step 340. The user will initiate the emergency start step 310 by entering a sequence in numbers that the local communication network will recognize as the emergency access number. For example, in most locations the number 911 is recognized as the emergency access number.

To ensure that the emergency voice communication is not inadvertently disrupted, the GPS algorithm 300 proceeds to a user acknowledge query 320 where user indicates the desire to transmit location coordinates or a message to the PSAP. If, in the user acknowledge query 320, the user indicates that he does not want to send location information or a message, then the GPS algorithm 300 proceeds to a stop step 330 and the algorithm terminates. Otherwise, the GPS algorithm proceeds to a Teletype type step 350, which is discussed below.

Likewise, the user may merely wish to determine his or her location for navigational or other purposes. Accordingly, in a coordinate step 340, the user may initiate a location query by entering a predetermined command into the mobile phone. For example, the user may press the "#" key to determine his location.

Next, whether determining the location in response to a coordinate transfer step 340 or in response to an emergency start step 310, the GPS algorithm 300 must determine the correct Teletype (TTY/TDD) protocol to use to send the location information to the destination TTY/TDD device. Therefore, the GPS algorithm 300 next determines the appropriate TTY/TDD protocol in a TTY/TDD Protocol Determination step 350. This could be accomplished by querying the destination TTY/TDD device, or by noting the location of the GPS receiver in the called number, or perhaps in the country code of the dialed number. Accordingly, a number of different TTY/TDD protocols could be stored by the processor, or the processor could be dynamically configured by the mobile communications network to produce TTY/TDD location information that is compatible with the destination TTY/TDD device. It should be noted that the TTY/TDD protocol may be preselected by the user. For example, more advanced user configurations could allow the user to determine a TTY/TDD encoding based on country code, the number dialed, a user preference, a TTY/TDD detection algorithm or a user input. When the TTY/TDD protocol is preselected by the user, the TTY/TDD protocol selected by the user is be loaded into the processor in the TTY/TDD Protocol Determination step 350.

Following the TTY/TDD Protocol Determination step 350, in a GSM location step 360, the GPS receiver determines the coordinates of its location based on the receipt of signals from satellites circling the earth, and converts the coordinates into location information comprising at least a longitude statistic and a latitude statistic. The GSM location step 360 may be implemented in software as a location determination module. Then, following the GSM location step 360, the longitude statistic and the latitude statistic are converted into a TTY/TDD recognizable format (the TTY/TDD format needed by the destination TTY/TDD device, as recognized in the TTY/TDD Protocol Determination step 350) in a synthesize step 370. Accordingly, the synthesis of the GPS location information to a TTY/TDD format may be accomplished in software by a GPS to TTY/TDD synthesizing module.

Following the synthesize step 370 the GPS algorithm 300 executes a blank-and-burst mode. The blank-and-burst mode first comprises a mute step 380, which terminates sounds on the voice path. In addition, the blank imburse mode next executes a transmit step 390. In the transmit step 390, the transceiver sends the location information, or a predetermined message, to the PSAP across the voice path. Furthermore, the blank-and-burst mode includes an enable sound step 400, which reverses the mute step 380 and allows the user of the mobile phone to again communication across the voice path. Following the enable sound step 400 the GPS algorithm 300 should determine whether a retransmission of the location data, or a retransmission of the message, is needed.

Therefore, in a retransmit query 410, the GPS algorithm determines whether a retransmission of the location information or the message is required by querying the processor for evidence of a user chosen retransmission criteria. If no retransmission is required then the GPS algorithm 300 proceeds to a stop step 420 and the algorithm terminates. If however, the transmission is needed, the GPS algorithm 300 proceeds to a retransmit step 430. The transmit step 430 implements retransmission based on the user selected criteria. Accordingly, the user may select to retransmit location information or a message periodically, a predefined number of times, over a predetermined period, when the GPS receiver location changes more than a preselected distance, or at a user request, such as the entry of the "#" key. The number of user configurations and criteria for retransmission are legion, and limited only by the imagination of the mobile phone's GPS algorithm programmer.

Following the retransmit step 430, the GPS algorithm returns to the GSM location step 360 so that a more recent location of the GPS receiver can be gathered, creating a location loop.

EXAMPLE

An example of using a GPS enabled mobile phone may help to facilitate understanding of the invention. When the GPS enabled phone, such as the mobile phone 110, is selected by the user to be in an "automatic 911" configuration, and the "#" is designated by the user for producing the display and transmission of GPS location information, we can say that entering 911 initiates the emergency start step 310, and that pressing the "3" initiates the coordinate transfer step 340. The GPS receiver would then gather the location statistics for the mobile phone, the TTY/TDD synthesizer would then process the location statistics into a TTY/TDD compatible format, and the transceiver would transmit the location statistics to a PSAP. Accordingly, when 911# is pressed, the GPS coordinates will be 1) displayed on the phone and 2) transmitted over the air. Retransmission would be executed as selected in advance by the user. As pointed out, although, this requires additional logic in the mobile phone and/or mobile switch, it does not require upgrades at the PSAP.

One advantage of providing a display of the numbers is that if the PSAP does not support TTY/TDD reception, the PSAP operator would inform the caller that the PSAP does not support automatic location retrieval and request that the caller press the "#" key. The mobile subscriber could then read the coordinates verbally to the PSAP operator. Alternatively, the PSAP operator can use an attached TTD device (such as another mobile phone) to display the coordinates. The PSAP operator can then manually enter this data into the ALI database and locate the subscriber.

While the invention has been described in conjunction with preferred embodiments, it should be understood that modifications will become apparent to those of ordinary skill in the art and that such modifications are therein to be included within the scope of the invention and the following claims.

What is claimed is:

1. A method of reporting a location of a Global Positioning System (GPS) receiver in a mobile communications network, comprising the steps of:
   determining a location of a GPS receiver disposed in a mobile phone;
   identifying the location as location information;
   synthesizing the location information into a Teletype/Telephony Device for the Deaf (TTY/TDD) compatible format; and
   transmitting the location information through the mobile communications network as a TTY/TTD transmission.

2. The method of claim 1 further comprising the step of re-transmitting the location information as a TTY/TDD message.

3. The method of claim 2 wherein the step of re-transmitting is repeated a predetermined number of times.

4. The method of claim 2 wherein the step of re-transmitting is repeated periodically.

5. A method of reporting a location of a Global Positioning System (GPS) receiver in a mobile communications network, comprising the steps of:
   determining a location of a GPS receiver disposed in a mobile phone;
   identifying the location as location information;
   synthesizing the location information into a Teletype/Telephony Device for the Deaf (TTY/TDD) compatible format; and
   transmitting the location information through the mobile communications network as a TTY/TDD transmission;
   re-transmitting the location information as a TTY/TDD message; and
   repeating the re-transmission when the location of the GPS receiver changes more than a predetermined value.

6. The method of claim 2 wherein the step of re-transmitting is initiated at the request of a user.

7. The method of claim 1 further comprising the step of receiving a location query.

8. The method of claim 7 wherein the location query comprises an emergency number.

9. The method of claim 1 further comprising the step of querying a user of the mobile phone for a verification.

10. The method of claim 1 wherein transmitting is accomplished in a blank and burst mode.

11. A method of reporting a location of a Global Positioning System (GPS) receiver in a mobile communications network, comprising the steps of:
    determining a location of a GPS receiver disposed in a mobile phone;
    identifying the location as location information;
    synthesizing the location information into a Teletype/Telephony Device for the Deaf (TTY/TDD) compatible format; and
    transmitting the location information in a blank and burst mode through the mobile communications network as a TTY/TDD transmission, the blank and burst mode comprising the steps of:
    muting voice communications,
    transmitting the TTY/TDD transmission, and
    reactivating voice communications.

12. The method of claim 1 wherein location information comprises a longitude statistic and a latitude statistic.

13. The method of claim 1 wherein the step of transmitting the location information comprises transmitting the location information to a Public Safety Answering Point.

14. The method of claim 1 further comprising the step of determining an appropriate Teletype protocol.

15. The method of claim 1 further comprising the step of detecting a Teletype protocol acceptable by a Public Safety Answering Point.

16. The method of claim 1 further comprising the step of implementing the Teletype protocol selected by a user.

17. The method of claim 1 wherein the step of transmitting is accomplished by transmitting the teletype transmission across a voice channel.

18. A mobile phone capable of transmitting location information gathered by a Global Positioning System (GPS) receiver to a Public Safety Answering Point (PSAP), comprising:
    a transceiver;
    a GPS receiver; and
    a Teletype/Telephony Device for the Deaf (TTY/TDD) synthesizing module in communication with the GPS receiver and the transceiver whereby the transceiver transmits location data to the PSAP.

19. The mobile phone of claim 18 further comprising a microprocessor in communication with the transceiver.

20. A mobile phone capable of transmitting location information gathered by a Global Positioning System (GPS) receiver to a Pubic Safety Answering Point (PSAP), comprising:
    a transceiver;
    a GPS receiver;
    a Teletype (TTY/TTD) synthesizer in communication with teh GPS receiver and the transceiver; and
    a microprocessor in communication with the transceiver, wherein the microprocessor stores a GPS algorithm.

21. In a mobile phone, a method executable as a computer program capable of reporting a location of a Global Positioning System receiver in a mobile communication network, comprising;

a location determination module;

a GPS to Teletype/Telephony Device for the Deaf (TTY/TDD) synthesizing module; and a transmission module.

* * * * *